United States Patent
Walthert et al.

(10) Patent No.: US 10,099,743 B2
(45) Date of Patent: Oct. 16, 2018

(54) SUSPENSION CONTROL SYSTEM FOR A BICYCLE, BICYCLE, AND SUSPENSION CONTROL METHOD

(71) Applicant: DT SWISS INC., Grand Junction, CO (US)

(72) Inventors: Martin Walthert, Aarberg (CH); Valentin Wendel, Biel (CH); Stefan Battlogg, St. Anton in Montafon (AT); Gernot Elsensohn, St. Anton in Montafon (AT)

(73) Assignee: DT Swiss Inc., Grand Junction, CO (US)

( * ) Notice: Subject to any disclaimer, the term of this patent is extended or adjusted under 35 U.S.C. 154(b) by 845 days.

(21) Appl. No.: 14/580,646

(22) Filed: Dec. 23, 2014

(65) Prior Publication Data

US 2015/0175236 A1 Jun. 25, 2015

(30) Foreign Application Priority Data

Dec. 23, 2013 (DE) .......................... 10 2013 021 892

(51) Int. Cl.
*B60G 17/015* (2006.01)
*B62K 25/04* (2006.01)
(Continued)

(52) U.S. Cl.
CPC .......... *B62K 25/04* (2013.01); *B60G 17/0165* (2013.01); *B60G 17/048* (2013.01); *B60G 17/08* (2013.01); *B62K 25/08* (2013.01); *F16F 9/18* (2013.01); *F16F 9/535* (2013.01); *B60G 2202/314* (2013.01); *B60G 2206/41* (2013.01);

*B60G 2206/42* (2013.01); *B60G 2300/12* (2013.01); *B60G 2400/202* (2013.01); *B60G 2400/25* (2013.01); *B60G 2500/106* (2013.01);
(Continued)

(58) Field of Classification Search
CPC .... B62K 25/08; B62K 25/04; B60G 17/0165; B60G 17/048; B60G 17/08; F16F 9/18
USPC .................... 280/276, 284; 188/315, 322.16; 267/64.22, 64.26
See application file for complete search history.

(56) References Cited

U.S. PATENT DOCUMENTS 6,026,939 A * 2/2000 Girvin .............. B60G 17/01941
188/266.7
6,311,962 B1 * 11/2001 Marking ................ B60G 15/14
188/322.17
(Continued)

FOREIGN PATENT DOCUMENTS

DE 10240568 A1 3/2004
DE 60126180 T2 5/2007
(Continued)

*Primary Examiner* — Anne Marie M Boehler
(74) *Attorney, Agent, or Firm* — Laurence A. Greenberg; Werner H. Stemer; Ralph E. Locher

(57) ABSTRACT

A suspension control system and a method for controlling a damper device of a bicycle include a damper device and a spring device for sprung damping of a relative motion between a first and a second component of the bicycle. The suspension device has a spring unit exhibiting a spring characteristic, and the damper device exhibits a damping characteristic. The spring characteristic of the spring unit is changed under the control of an electrically operated actuator, which in turn is controlled via an electric control device.

17 Claims, 7 Drawing Sheets

(51) Int. Cl.
*F16F 9/53* (2006.01)
*F16F 9/18* (2006.01)
*B62K 25/08* (2006.01)
*B60G 17/0165* (2006.01)
*B60G 17/048* (2006.01)
*B60G 17/08* (2006.01)
*F16F 9/32* (2006.01)

(52) U.S. Cl.
CPC ............... *B60G 2500/2014* (2013.01); *B60G 2500/2022* (2013.01); *B60G 2500/2041* (2013.01); *B60G 2500/2046* (2013.01); *B60G 2500/22* (2013.01); *B60G 2600/1879* (2013.01); *B60G 2600/26* (2013.01); *B60G 2600/82* (2013.01); *B60G 2800/16* (2013.01); *B60G 2800/182* (2013.01); *B62K 2025/044* (2013.01); *F16F 9/3292* (2013.01); *F16F 2228/063* (2013.01)

(56) References Cited

U.S. PATENT DOCUMENTS

| | | | |
|---|---|---|---|
| 6,360,857 B1 * | 3/2002 | Fox | F16F 9/3485 188/281 |
| 6,543,754 B2 | 4/2003 | Ogura | |
| 6,938,887 B2 * | 9/2005 | Achenbach | B60G 17/08 188/315 |
| 7,484,603 B2 * | 2/2009 | Fox | B62K 25/04 188/275 |
| 8,757,652 B2 | 6/2014 | Battlogg et al. | |
| 8,886,403 B2 | 11/2014 | Battlogg et al. | |
| 8,894,050 B2 * | 11/2014 | Wootten | B60G 17/048 267/64.18 |
| 8,936,139 B2 * | 1/2015 | Galasso | F16F 9/3292 188/319.1 |
| 2011/0140392 A1 * | 6/2011 | Battlogg | F16F 9/535 280/284 |
| 2012/0186922 A1 | 7/2012 | Battlogg et al. | |
| 2013/0118847 A1 | 5/2013 | Krahenbuhl et al. | |

FOREIGN PATENT DOCUMENTS

| | | |
|---|---|---|
| DE | 102009058847 A1 | 6/2011 |
| DE | 102010055828 A1 | 6/2012 |
| DE | 102011009405 A1 | 7/2012 |
| EP | 1394439 A1 | 3/2004 |
| EP | 1818250 A2 | 8/2007 |
| WO | 2010020428 A1 | 2/2010 |

* cited by examiner

SUSPENSION CONTROL SYSTEM FOR A BICYCLE, BICYCLE, AND SUSPENSION CONTROL METHOD

CROSS-REFERENCE TO RELATED APPLICATION

This application claims the priority, under 35 U.S.C. § 119, of German patent application DE 10 2013 021 892.6, filed Dec. 23, 2013; the prior application is herewith incorporated by reference in its entirety.

BACKGROUND OF THE INVENTION

Field of the Invention

The present invention relates to a suspension control for an at least partially muscle-powered, two-wheeled vehicle and in particular a bicycle and a control method. The suspension comprises at least one damper device for damping shocks acting on the suspension. A bicycle equipped with such a suspension control may be equipped with an auxiliary drive and in particular an electric auxiliary drive.

Many different types of rear wheel dampers and suspension forks for bicycles have been described in the prior art. A shock absorber typically comprises a spring unit for springing any shocks occurring and a damping unit for damping the spring vibration. In the case of damper devices configured as rear wheel shock absorbers the spring unit and the damping unit are as a rule configured as an integral unit. In the case of damper devices configured as suspension forks the damping unit and the spring unit may be disposed separately.

Most dampers for bicycles are operated using oil for the damping fluid. For damping, the damping fluid is conveyed from a first damping chamber to a second damping chamber through a valve gate throttling the flow. The size of the valve gate aperture determines the damping strength. An optimal damping is dependent on a number of factors such as the rider's weight and in particular the terrain characteristics. It is desirable to set the damping strength in relation to loads and speeds such that weak shocks are dampened less than are heavy shocks. For riding on roads, over forest paths, or directly off-road, different damping settings are therefore optimal.

For adjusting and influencing damping, magnetorheological fluids have been disclosed whose characteristics can be influenced by way of applying a suitable magnetic or electric field.

Most magnetorheological fluids consist of a suspension of small particles that polarize magnetically and which are finely dispersed in a carrier liquid such as oil. The polarizing particles which tend to consist of a carbonyl ferrous powder have typical diameters between approximately 0.1 and 50 micrometers, and under the influence of a magnetic field they form chain-like structures capable of absorbing field-dependent shear stresses. This allows to vary the flow resistance of a valve in a way similar to viscosity changes. The process is fast and reversible such that the initial rheologic state will be reinstated as the magnetic field is broken. Thus, magnetorheological fluids are suitable to be used in dampers of bicycles.

Such a damper is described in our commonly assigned prior application Ser. No. US 2012/0186922 A1 and its counterpart German published patent application DE 10 2011 009 405 A1. Our prior shock absorber for bicycles uses a magnetorheological fluid for the damping fluid. For damping, the damping valve with the damping duct is exposed to a magnetic field of a desired strength to thus achieve the set damping. The bicycle is provided with an exchangeable electronic unit so that a beginner/first time user may use an electronic unit offering little or no adjustment options while an experienced user or expert exchanges the electronic unit for a model having a wider range of adjustment options.

Specifically the exchangeable electronic units enable this known damper to provide a multitude of adjustment options for the magnetorheological damper so that the damper is adaptable to different conditions. The construction of the shock absorber, however, provides a specific, essentially invariable basic damping or minimum damping which is effective even with a deactivated magnetorheological damper when the damping valve is not exposed to a magnetic field. The basic damping and the ensuing maximum compressing and rebounding speeds cannot be changed in operation.

SUMMARY OF THE INVENTION

It is accordingly an object of the invention to provide a suspension control apparatus for a bicycle and a method which overcomes the above-mentioned and other disadvantages of the heretofore-known devices and methods of this general type and which provides for a suspension control and a matching two-wheeled vehicle and a control method that afford still better control and adaptation. Faster compressing and rebounding motions can in particular be enabled.

With the foregoing and other objects in view there is provided, in accordance with the invention, a suspension control system for an at least partially muscle-powered two-wheeled vehicle, the suspension control system comprising:

at least one damper device and at least one spring device for sprung damping a relative motion between a first component and a second component of the vehicle;

the at least one damper device having a damping characteristic;

the at least one spring device having at least one spring unit with a variable spring characteristic;

at least one electrically operated actuator configured to vary the spring characteristic of the spring unit; and a control device for controlling the actuator.

In other words, a suspension control according to the invention for an at least partially muscle-powered two-wheeled vehicle, such as a bicycle, comprises in particular a damper device and at least one spring device for sprung damping relative motions between first and second component. The suspension device comprises at least one spring unit showing a spring characteristic, and the damper device shows at least one damping characteristic. The spring characteristic of the spring unit is variable by way of at least one electrically operated actuator. The actuator can be controlled by at least one electric control device.

The suspension control according to the invention has many advantages. A considerable advantage of the suspension control according to the invention is that not only the damping characteristics of the damper device can be changed but variations to the or at least one of the spring characteristics of the spring unit and thus of the entire spring device can be controlled during operation. In particular can variations to the spring characteristic of at least one spring unit be coupled to variations to a damping characteristic of the damper device. It is possible for one or two or more spring units or their spring properties or spring characteristics to be variable. Preferably the damper device is provided with at least one magnetorheological fluid and comprises at least one adjustable magnetorheological damping valve. It is also possible to provide two or more magnetorheological and/or conventional damping valves wherein preferably at least one magnetorheological and/or conventional damping valve is adjustable in operation by means of the control device.

A variable spring characteristic is in particular understood to mean a position of the spring unit or of part of the spring unit or lowering the suspension fork or adjusting the suspension hardness, the volume of the spring unit or the volume of part of the spring unit, or of a pressure of the spring unit or of part of the spring unit, or a suspension travel.

The suspension control according to the invention allows during operation and even during rides a simple and energy-saving way of changing the spring characteristics for at least one wheel of the bicycle. The adjustable spring characteristic allows to increase or decrease the compressing speed and the rebounding speed while damping remains at the same level. This allows a larger range and increased complexity of influencing the suspension control. Preferably the damping characteristics of the at least one magnetorheological valve can be adjusted as well.

Preferably the electrically actuated actuator comprises at least one control valve or such valve is configured. Preferably the electrically operated actuator comprises at least one adjustment device or such a device is configured.

Preferably the spring unit comprises at least one fluid spring provided with a compressible fluid. In particular the spring force of the fluid spring is variable.

Preferably the fluid spring comprises a positive chamber provided with the compressible fluid and a negative chamber provided with the compressible fluid. The positive chamber is in particular defined by a spring piston.

In advantageous configurations an equalizing device is provided. The equalizing device is in particular adjustable. The equalizing device preferably comprises at least one actuator of the at least one actuator. Via the equalizing device the control device can control the establishing of fluid exchange and in particular of a preferably complete pressure compensation between the negative chamber and the positive chamber.

Preferably at least two different axial positions of the suspension piston allow to control the establishing of fluid exchange between the negative chamber and the positive chamber. In advantageous specific embodiments, fluid exchange is possible in a multitude or a plurality of positions and in specific embodiments, in any desired axial position of the spring piston.

When during predetermined damping the rebounding speed is too low so that the traction in a specified traveling way is too weak, then the rebounding speed may be increased by increasing the spring strength of the spring unit so as to obtain better traction and thus better ground adhesion so as to increase the operational safety of the bicycle as well.

The electrically operated actuator or at least one of the electrically operated actuators can influence a position of the shock absorber or of the spring unit. An actuator changes in particular the spring force of the spring unit. The control device electrically controls varying the spring force of the spring unit.

In preferred specific embodiments the fluid spring comprises a positive chamber provided with the compressible fluid and a negative chamber provided with the compressible fluid. A fluid spring comprising a positive chamber and a negative chamber allows fine control of the spring characteristics since selecting the volumes of the positive chamber and the negative chamber and configuring the cross section of the positive chamber and the negative chamber allow different curves and steepnesses of the spring properties and the spring characteristics of the fluid spring on the whole.

In particularly advantageous configurations the fluid volume or the active fluid volume of the positive chamber is variable by means of the electrically operated actuator. Preferably, variations to the fluid volume or the active fluid volume of the negative chamber are electrically controlled by means of the electrically operated actuator.

In advantageous specific embodiments it is preferred for the positive chamber of the fluid spring to comprise at least two chamber sections which can be connected with, and separated from, one another by means of an electrically controlled control valve. It is also preferred for the negative chamber of the fluid spring to comprise at least two chamber sections which can be connected with, and separated from, one another by means of an electrically controlled control valve. Particularly preferably the positive chamber comprises at least two chamber sections, and the negative chamber comprises at least two chamber sections, each of which can be separated from, and connected with, one another by means of an electrically controlled control valve. An electrically controlled control valve serves as an electrically operated actuator so that via the electrically operated actuator configured as a control valve the chamber sections of the positive chamber and/or of the negative chambers can each be connected with, and separated from, one another. This allows to reduce or enlarge the active volume of the positive chamber via the electrically controlled control valve. In the same way the active volume of the negative chamber can be enlarged or reduced.

In all the cases it is preferred to use in particular a gas and preferably air for the compressible fluid for the fluid spring. If, given a constant pressure for example within the two chamber sections of the positive chamber, the control valve between the two chamber sections of the positive chamber is opened then the two chamber sections of the positive chamber are connected with one another and operate jointly. Thus the positive spring will become softer since the active volume of the positive spring has increased. In the same way the spring characteristic of the negative spring of the fluid spring is changed when the two chamber sections of the negative spring or of the negative chamber are connected with one another.

A considerable advantage of using multiple chamber sections for the positive chamber and/or the negative chamber of the fluid spring is that the control valves need only little electric energy for connecting or separating the chamber sections. This allows use also in muscle-powered bicycles where for reasons of weight and energy one cannot simply use a compressor for increasing or reducing in operation the pressure level in the positive chamber and/or the negative chamber. The compression of gas is energy-intensive. Using a compressor is as a rule not suitable for bicycles.

In preferred specific embodiments the negative chamber of the fluid spring can be connected with the positive chamber of the fluid spring via an equalizing device. In particular can the position be set or selected in which the negative chamber of the fluid spring can be connected with the positive chamber of the fluid spring. This means that in at least one position a pressure compensation takes place or can take place between the positive chamber of the fluid spring and the negative chamber of the fluid spring. It is thus ensured that during operation the force relationships will not inadmissibly slide, even permanently. The adjustable equalizing device allows to influence the pressure relationship and thus the spring characteristic of the fluid spring. The volume of the negative chamber and the volume of the positive chamber at which pressure is compensated between the positive chamber and the negative chamber will accordingly influence the spring force during further compressing or rebounding. This allows to vary the force path of the fluid spring accordingly by way of the suspension travel. Adjusting the equalizing device so that pressure between the positive chamber and the negative chamber is already compensated for comparatively short suspension travels allows easier compression, and vice versa.

The mechanical adjustment of the position of the adjustable equalizing device is easy and requires little energy.

In all the configurations it is preferred for a spring piston to separate the negative chamber from the positive chamber. The adjustable equalizing device may, preferably in an adjustable position, connect the negative chamber with the positive chamber. It is possible to establish a connection of the negative chamber with the positive chamber by means of a control valve in the shape of e.g. a controlled equalizing valve controlled by the control device. In simple cases a control valve is provided in the spring piston. It is also possible for a control valve to be disposed externally and to establish a connection for fluid exchange between the negative chamber and the positive chamber as needed. It is possible for such a control valve disposed internally or externally to allow fluid exchange of the negative chamber with the positive chamber in any desired position.

In a preferred specific embodiment the positive chamber and the negative chamber can be connected via at least one compensating line and multiple controllable control valves provided in different positions as electrically operated actuators for adjusting pressure compensation between the positive chamber and the negative chamber in an adjustable, selectable position.

In other configurations it is possible the length and/or position of the equalizing device can be adjustable. In simple configurations it is possible for the equalizing device to comprise an equalizing plunger or the like wherein, given an adjustable spring position, the equalizing plunger opens a valve in the spring piston or another valve so as to enable pressure compensation between the negative chamber and the positive chamber.

In particularly simple configurations the equalizing plunger is provided at the spring piston and mechanically opens an equalizing valve in the spring piston when the equalizing plunger reaches a stopper.

The position of the equalizing device can for example be set by varying the length of the equalizing plunger. It is also possible for the stopper interacting with the equalizing plunger to be adjustable. For example the length of the equalizing plunger and/or the position of the stopper can be electrically variable.

The equalizing device may for example be adjusted via a simple electric motor or another electric or magnetic adjusting device consuming very little energy. The energy used is required only for mechanically adjusting the length of the equalizing device and/or the position of a stopper. Displacement does not involve countering any pressure so as to provide an easy, fast and low-energy adjusting process.

It is also possible to provide a switchable equalizing valve allowing or prohibiting a flow connection between the positive chamber and the negative chamber as a predetermined position is reached.

In preferred specific embodiments a sensor device is provided for obtaining the relative positions of the first versus the second components. Preferably the control device is set up and configured to adjust a fluid pressure of the compressible fluid in the positive chamber and/or the negative chamber by controlled opening and closing of at least one control valve. Controlling can be done by using sensor device signals. This configuration is very advantageous because increasing the fluid pressure does not require a compressor but the fluid pressure is adjusted by way of intelligent controlling a control valve. This controlling can for example be done by way of opening respectively closing a control valve between two chamber sections of the positive chamber at maximum compression respectively rebound. This allows to influence the air quantity and the actively operative air volume present in the active positive chamber so as to allow to set or adjust different spring characteristics of the positive chamber without requiring for example an energy-intensive compressor.

The control valve can be controlled during normal vehicle operation so as to utilize the shocks occurring in compressing or rebounding for adjusting the pressure level in the positive chamber. In analogy, influencing the pressure level in the negative chamber can likewise be controlled. Controlling the control valve between the two chamber sections of the positive chamber and/or controlling the control valve between the two chamber sections of the negative chamber is possible not only in complete compression or rebound but in any desired intermediate positions as well. Utilizing the shock energy during riding and controlled opening and closing the control valves thus allows to considerably influence the entire characteristic of the suspension control and the spring characteristic of the fluid spring.

In an advantageous specific embodiment at least one memory device is provided. The control device and the memory device define at least one characteristic damper curve which defines a curve of the damping force by way of a relative speed of first versus second components. At least one sensor device is provided and the control device and the sensor device are configured and set up to periodically obtain at least one current characteristic value for the current relative speeds between the first and second components. The control device is set up and configured to derive, by means of the current characteristic value from the characteristic damper curve stored in the memory device, a pertaining current setting for the controllable damping valve and to set the damping valve accordingly so as to set a current damping force ensuing from the (currently set) characteristic damper curve based on the current characteristic value obtained.

In preferred specific embodiments the zero passage of the characteristic damper curve is displaceable.

Preferably a modified characteristic damper curve is set and/or stored in the memory device and/or can be retrieved from the memory device within less than 1 minute and in particular within less than 1 second.

Preferably the damper device is provided with at least one magnetorheological fluid and comprises at least one magnetorheological damping valve. The damping valve comprises at least one damping characteristic adjustable by the control device so that both the damping characteristic of the damping valve and the spring characteristic of the spring unit can be modified via the electric control device.

In preferred specific embodiments the control device is suitable and configured to set a characteristic damper curve where in the case of a higher relative speed a lower damping force is set than in the case of a lower relative speed. Preferably an operating device is provided which is in particular suitable and configured to set a characteristic damper curve in which the rebound damping is set independently of the compression damping. In advantageous specific embodiments and configurations of the invention an electric coil device is assigned to the damper device for a field generating device. A current intensity of the electric coil device is reset periodically, at least some of the periods being shorter than 1 second or shorter than 50 milliseconds. In particularly preferred specific embodiments the current intensity of the electric coil device is set in periods of less than 50 or even 20 milliseconds.

An inventive bicycle comprises a supporting structure comprising a frame, a steering device, and two wheel accommodations at the supporting structure. The supporting structure accommodates two wheels. At least one suspension control is provided for springing and damping a relative motion of at least one of the wheels and in particular of both of the wheels relative to the supporting structure. The suspension control comprises at least one damper device provided with at least one magnetorheological fluid and at least one suspension device for sprung damping of a relative motion of the wheel relative to the supporting structure.

The damper device comprises at least one adjustable magnetorheological damping valve. The spring characteristic of the spring unit is variable by way of at least one electrically operated actuator. The actuator can be controlled by at least one electric control device so that the damping of the damping valve and also the spring characteristic of the spring unit can be changed via the electric control device.

The method according to the invention serves to control a suspension of an at least partially muscle-powered two-wheeled vehicle and in particular a bicycle comprising at least an in particular controllable damper device and at least one spring device for sprung damping of a relative motion between a first and a second component. The suspension device comprises at least one spring unit showing a spring characteristic, and the damper device shows at least one damping characteristic. The, or at least one, spring property of the spring unit or the spring characteristic of the spring unit is on the whole changed by way of at least one electrically operated actuator. The actuator is controlled by at least one electric control device.

The method according to the invention also has many advantages. A significant advantage is the electric control of the spring characteristic of the spring unit. Preferably the damping characteristic of the damper device is likewise controlled by the electric control device.

Preferably the spring unit comprises a fluid spring having a positive chamber and/or a negative chamber. It is possible for two chamber sections of the positive chamber to be connected with, and separated from, one another in a controlled manner. It is likewise possible for two chamber sections of the negative chamber to be connected with, and separated from, one another in a controlled manner for setting and adjusting the spring force of the positive spring and/or the negative spring. The positive spring and the negative spring together form the fluid spring. Or else it is possible for the fluid spring to consist of one positive spring only or one negative spring only.

In preferred configurations the chamber sections of the positive chamber are separated from one another when compressed to provide a modified and preferably increased force of the positive chamber. It is likewise preferred for the chamber sections of the positive chambers to be separated from one another in rebound to provide a modified and preferably decreased spring force of the positive chamber. In the case of two or more chamber sections such a method allows a simple way of utilizing the operation of the bicycle and the shocks acting thereon for increasing and/or decreasing the active pressure in the positive chamber.

In a similar way the chamber sections of the negative chambers can be separated from one another in rebound for providing an increased spring force of the negative chamber, and the chamber sections of the negative chambers can be separated from one another in compression for providing a reduced spring force of the negative chamber.

It is also possible and preferred to compensate the pressure of the positive chamber and the negative chamber in an adjustable position. To adjust the position of pressure compensation, the position of a length of the equalizing device or a stopper interacting with, or belonging to, the equalizing device is changed. Or else, by way of controlling with the control device, a control valve or equalizing valve opens in an adjustable or freely selectable position to compensate the pressure between the positive chamber and the negative chamber.

Other features which are considered as characteristic for the invention are set forth in the appended claims.

Although the invention is illustrated and described herein as embodied in suspension control for a bicycle and method it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The enclosed drawing illustrates an exemplary embodiment of the invention with a bicycle 200 equipped with a suspension control 300 and shock absorbers 100 according to the invention.

Figure 1:
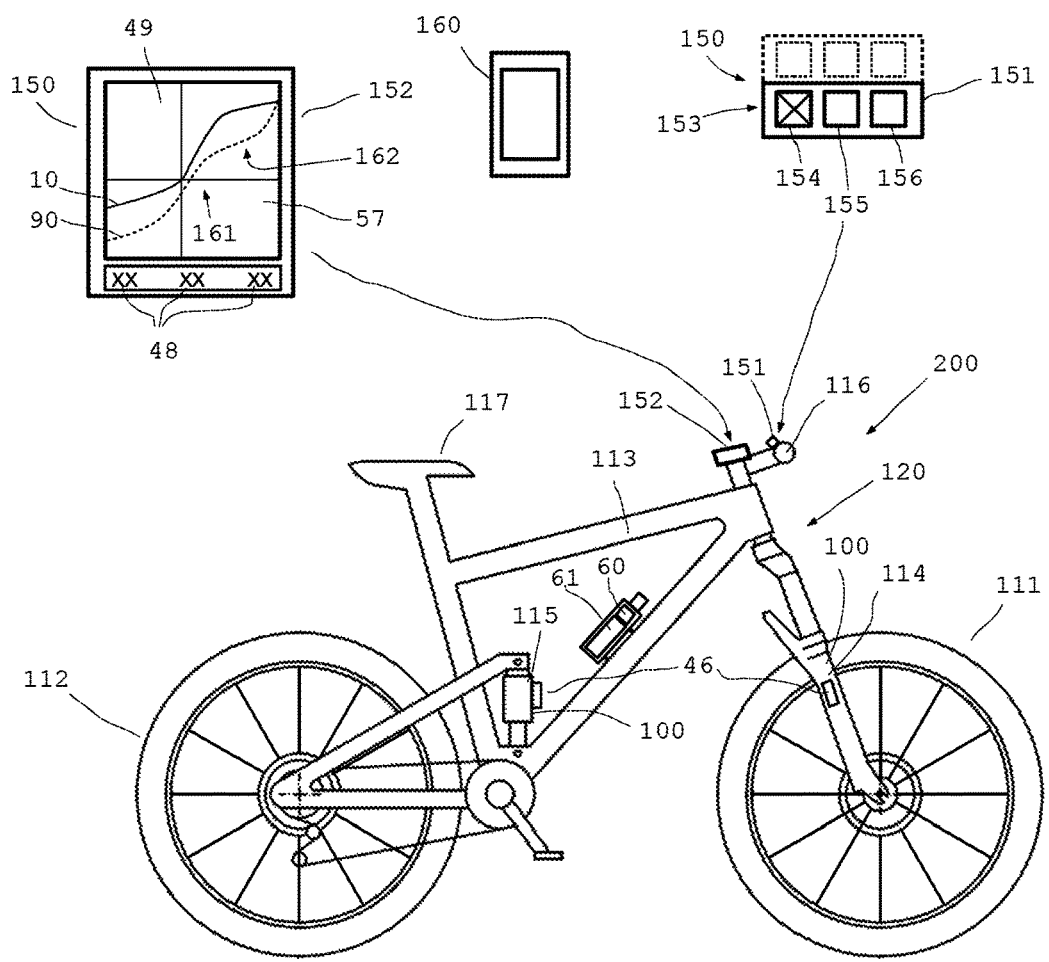
FIG. 1 is a schematic view of a bicycle equipped with a shock absorber according to the invention.

Referring now to the figures of the drawing in detail and first, particularly, to FIG. 1 thereof, there is shown a schematic illustration of a bicycle 200 which is configured as a so-called mountain bike with a frame 113, a front wheel 111 and a rear wheel 112. Both the front wheel 111 and the rear wheel 112 are equipped with spokes and may be provided with disk brakes. A gear shifting system serves to select the transmission ratio. Furthermore the bicycle 200 comprises a steering device 116 with a handlebar. Furthermore a saddle 117 is provided.

The front wheel 111 is provided with a shock absorber 100 configured as a suspension fork 114 and the rear wheel 112 is provided with a shock absorber 100 configured as a rear wheel damper 115.

A central control device 60 is provided together with a battery unit 61 in a water bottle-like container and disposed on the down tube where a water bottle is usually disposed although it may be provided in the frame. The central control device 60 may also be disposed on the handlebar 116.

The central control device 60 serves as a suspension control 200, controlling both the suspension fork 114 and the rear wheel shock absorber 115, separately and in particular in synchrony. Control of the shock absorbers 100 and further bicycle components may be provided in dependence on many different parameters and is also done by way of sensor data. Optionally the suspension and/or damping characteristics of the seat post can be adjusted. It is possible to also control by way of the central control device 60 the shifting system for adjusting different transmission ratios.

Additionally each of the shock absorbers 100 comprises at least one control device 46 at an electronic unit provided to be exchangeable. The electronic units may each comprise a separate battery unit. However, energy supply is preferred by way of the central battery unit 61 or supported or operated by a dynamo or the like.

The suspension control 200 and the central control device 60 are operated via operating devices 150. Two operating devices 150 are provided, namely an actuating device 151 and an adjustment device 152. The actuating device 151 comprises mechanical input units 153 at the lateral ends or in the vicinity of the lateral ends of the handlebar 116. The adjustment device 152 may be configured as a bicycle computer and may likewise be positioned at the handlebar 116. Or else it is possible to employ a smartphone 160 or a tablet computer or the like for the adjustment device 152 which is for example located in the user's pocket or backpack while no modifications to the settings need to be made.

The actuating device 151 comprises three mechanical input units serving as the controls 154, 155, 156 for operating the shock absorber 100. It is possible to dispose an actuating device 151 for the suspension fork 114 at one of the ends 116 of the handlebar and to provide another actuating device 151 for the rear wheel shock absorber 115 at the other of the handlebar ends. It is also possible to control both shock absorbers in synchrony via an actuating device 151. It is also possible to dispose at one of the lateral ends of the handlebar 116 an actuating device for example with six different controls for adjusting the two shock absorbers 100.

The actuating device 151, which is considerably more robust and sturdier than the operating device 152, is fixedly mounted to the handlebar 116. Each of the controls 154 to 156 designed as pressure switches or push buttons shows protection according to IP54, or better according to IP67 under DIN EN 60529. Protection from impacts is provided at least according to IK06 under DIN EN 622622. The controls 154 to 156 are thus sufficiently protected in normal operation so that the controls are not damaged in operation due to usual shocks or the like. Moreover the robust controls 154 to 156 provide for reliable operation even while riding downhill or the like.

In contrast to this the adjustment device 152, which is for example clipped to the handlebar or remains in the user's pocket or backpack, offers a considerably larger number and/or more clearly arranged adjustment options and it may be employed for modifying a displayed characteristic damper curve 10 in at least two or more sections 161, 162 etc. for setting the desired damper properties. The adjustment device 150 has a display 49 and may also output data 48 for example relating to the damper settings or else data about the current traveling speed etc. In addition to or instead of modifying the damping, at least one spring characteristic or the characteristic of suspension may be modified via the adjustment devices 150 and 152. In particular the suspension hardness in compressing or rebounding may be influenced. Moreover the rest position may optionally be set. One can for example lower the suspension fork 114 in (steep) mountain rides so as to reduce the inclination angle of the bicycle 200.

The display 49 is in particular configured as a graphical control unit or touchscreen 57 so that the user can for example touch a displayed characteristic damper curve 10 with his fingers and modify it by dragging. This allows to generate from the characteristic damper curve 10 shown in a solid line, by touching said line in one or more points 170 to 175, the illustrated characteristic damper curve 90 which is then henceforth employed for the suspension control 300. Modifying the characteristic damper curves 10, 90 is also possible while riding. In this case not only damping is modified but at the same time also, or only, the suspension can be modified.

The adjustment device 152 may also serve as a bicycle computer, displaying data about the current speed, and the average speed and/or kilometers per day, per tour, per lap, and total. It is also possible to display the current position, the current elevation of the route traveled and the route profile and also the estimated operational range under the current damping conditions.

Figure 2:
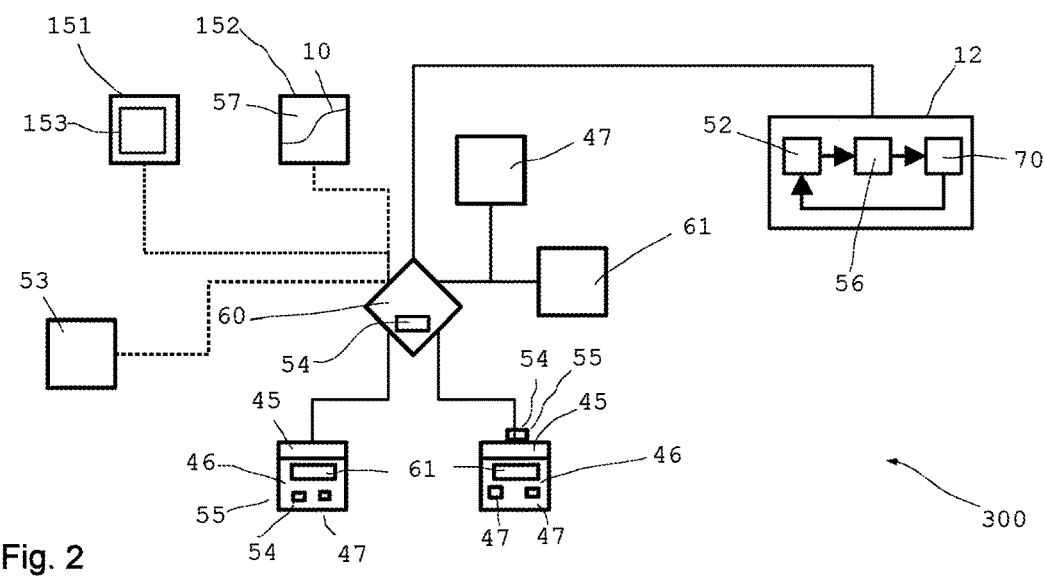
FIG. 2 is a schematic view of the controlling structure of the bicycle according to FIG. 1.

FIG. 2 shows a schematic illustration of the suspension control 300 and the communication links of some of the components involved. The central control device 60 may be connected with the individual components either wire-bound or wireless. The control device 60 may be connected with the other components for example through WLAN, Bluetooth, ANT+, GPRS, UMTS, LTE, or other transmission standards. Optionally the control device 60 may be connected wireless with the internet 53 via the link shown in a dotted line.

The control device 60 is linked with the battery unit 61. Furthermore the control device 60 may be linked with a sensor device 47 or with multiple sensors. The operating devices 150, namely the actuating device 151 and the adjustment device 152, are coupled with the control device 60 either wire-bound or wireless at least temporarily. Although the actuating device 151 is preferably coupled with the control device wire-bound, it may be linked wireless and may be provided with a separate battery such as a button cell or the like.

The actuating device 151 which is robust in structure comprises at least one mechanical input unit 153 in the shape of a switch or the like for outputting switching commands to the control device 60 for switching at least one damper property and/or spring characteristic. This may for example be, activating a lockout or activating a see-saw suppression or adjusting the damper hardness and/or the suspension hardness. Preferably a separate operating knob or the like is provided for each of these properties. Or else it is possible to use one single, mechanical input unit 153 for switching between options. The mechanical input unit 153 or a mechanical input unit may serve for modifying the springing properties. For example the suspension fork can be lowered and the rear wheel damper can be adapted accordingly.

The adjustment device 152 comprises a graphical control unit such as a touch-sensitive screen and can among other things show on the display 49 the current characteristic damper curve 10. For example touching and dragging the characteristic damper curve in single points 169, 170, 171, 172 and 173 allows to displace the characteristic damper curve 10 basically as desired to the sides or up and down (see FIG. 11B). The individual points 169, 170, 171, 172 or 173 etc. are preferably linearly linked. The individual points may also be linked dynamically via splines so as to obtain a rounded characteristic damper curve.

The control device 60 is connected with control devices 46 of the shock absorbers 100 at the front wheel and the rear wheel via network interfaces 54 or radio network interfaces 55. The control device 46 possibly provided at each of the shock absorbers 100 takes care of local controlling and may comprise a battery each or else it may be connected with the central battery unit 61. It is preferred to control both shock absorbers via the control device 60.

Preferably each of the shock absorbers 100 is provided with at least one sensor device 47 for obtaining relative motions between the components 101 and 102 and in particular for determining positions of the components 101 and 102 relative to one another. The sensor device 47 may be configured as, or may comprise, a displacement sensor. After obtaining a characteristic value of the relative speed the pertaining damping force and a suitable spring force are set by way of the characteristic damper curve 10 of the shock absorber 100 stored in the memory device 45. A suitable spring force may be determined via the weight of the rider. The weight of the rider can be derived for example by automatically determining the SAG position as a rider has mounted the bicycle. The compression travel as a rider mounts the bicycle allows conclusions about a suitable air pressure in the fluid spring or gas spring, which is then immediately set or approximated automatically or during operation.

FIG. 2 schematically shows the control cycle 12 which is stored in the memory device 45 and is backed up in or programmed into the control device 60. The control cycle 12 is periodically, in particular continuously periodically, performed in operation. In step 52 the sensors 47 capture a current relative motion or relative speed of the first component 101 versus the second component 102. In step 52 a characteristic value is derived from the values of the sensor 47 or the sensors which is representative of the current relative speed. Thereafter in step 56 the pertaining damping force 84 to be set is then derived from the current respectively obtained characteristic value 81 (see FIGS. 10, 11) taking into account the predetermined or selected characteristic damper curve. A measure of the field intensity or current intensity to be currently set is derived therefrom with which the damping force to be set is achieved at least approximately. The measure may be the field intensity or else it may e.g. indicate the current intensity with which the damping force to be set is achieved at least approximately.

In the subsequent step 70 the field intensity to be currently set is generated or the respective current intensity is applied to the electrical coil device 11 which serves as the field generating device, so that within one single cycle or one time period of the control cycle 12 the damping force is generated as it is provided for the selected or predetermined characteristic damper curve to the current speed ratio of the first component versus the second component. Thereafter the next cycle starts and step 52 is performed once again. In each cycle or in specific time intervals or given specific events the position or the spring force of the suspension device 26 is checked. To this end the strength of the spring force of the positive chamber 270 and the strength of the spring force of the negative chamber 280 is checked or determined in the fluid spring 260 (see FIG. 3). If a harder fluid spring 261 is desired, the second positive chamber 272 can for example be deactivated so as to provide the fluid spring 260 with a steeper spring force curve. Or the volume of the negative chamber 280 is modified or a position 292 of the equalizing device 290 is changed.

Figure 3A:
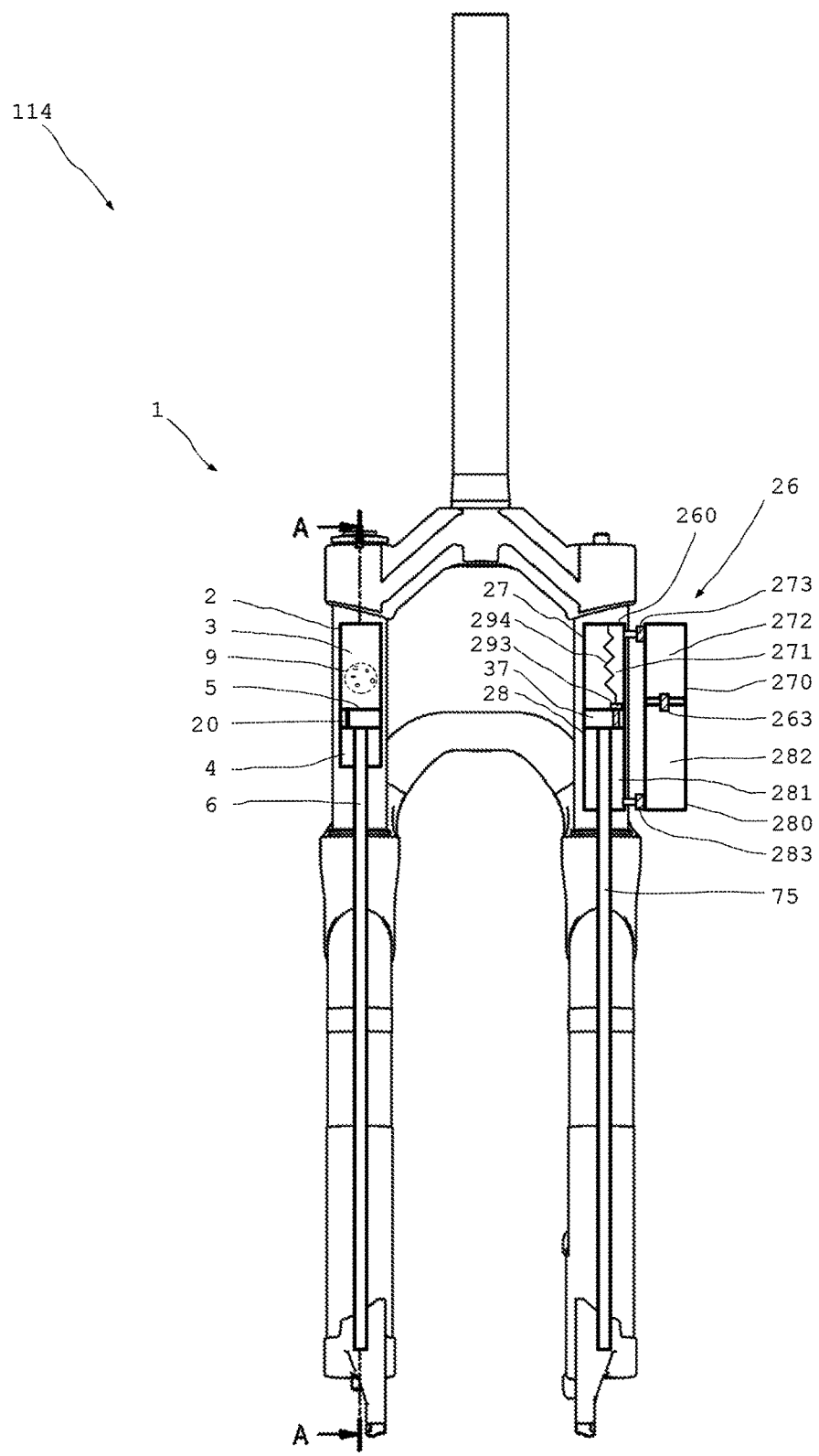
FIG. 3A is a schematic view of a suspension fork of the bicycle according to FIG. 1.
Figure 3B:
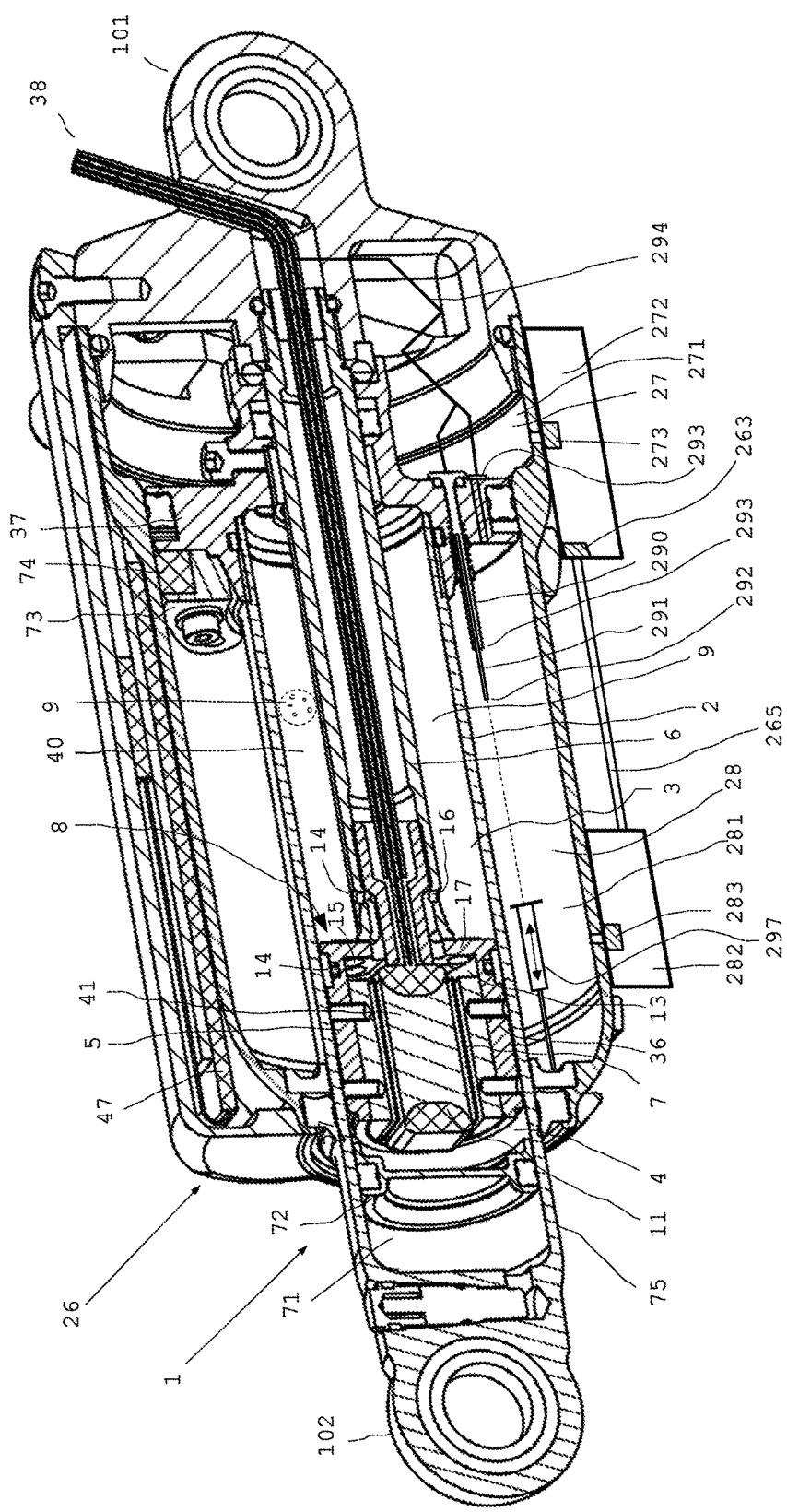
FIG. 3B is a schematic sectional view of a shock absorber of the bicycle according to FIG. 1.

FIG. 3A shows a simplistic view of a suspension fork 114 as it is employed for the front wheel 111, and FIG. 3B shows the rear wheel damper 115, which will be described together below.

The suspension fork 114 comprises a shock absorber 100. The shock absorber 100 comprises a damper device 1 in a leg of the suspension fork and a spring device in the other leg of the suspension fork. In other configurations the damper device 1 and the spring device 26 may be jointly disposed in one leg.

The shock absorber 100 is fastened by the first end serving as the component 101 and the second end serving as the component 102, to different parts of the supporting structure 120 or the frame 113 for springing and damping relative motions.

The shock absorber 1 comprises a first damper chamber 3 and a second damper chamber 4 in one combined damper housing 2. The two damper chambers 3 and 4 are separated from one another by the damper piston or damping piston 5 in or at which a magnetorheological damping valve 8 comprises a damping duct 20 through which the magnetorheological damping fluid 9 (MRF) courses. While the damper housing 2 is fastened to the upper part of the suspension fork 114 and thus to the frame 113, the damper piston 5 is connected with the lower dropout via the piston rod 6.

The other suspension strut of the suspension fork has disposed in it the suspension device 26 which comprises a spring unit 260 configured as a fluid spring 261. The suspension device comprises a housing in which the spring piston 37 separates a positive chamber 270 from a negative chamber 280. The positive chamber 270 forms a positive spring and the negative chamber 280 forms a negative spring the spring force of which tends to be lower in the rest position but is opposed to the spring force of the positive spring. This achieves good responsivity since the fluid spring 261 will respond already to weak shocks. The fluid spring 261 is filled with a fluid and presently with a gas and preferably with air.

The positive spring comprises two chamber sections 271 and 272 which can be separated from or connected with one another by means of a control valve 273 as required.

The negative spring comprises two chamber sections 281 and 282 which can be separated from or connected with one another by means of a control valve 283 as required.

The chamber section 272 of the positive chamber 270 and the chamber section 282 of the negative chamber 280 can be interconnected via the control valve 263. In this way the control valves 263, 273 and 283 can equalize the pressure between the positive chamber and the negative chamber in every desired spring position so as to change the characteristic of the fluid spring 261. The control valves 263, 273 and 283 serve as actuators the operation of which is controlled by the control device 60. This allows to freely adjust the rest position and to also lower a suspension fork for example in mountain rides. In a rear wheel shock absorber an additional volume if any can be deactivated in a chamber section and thus the springing at the rear wheel can be set harder for uphill rides. It is possible to provide only one of the control valves 263, 273 and 283. For example only the control valve 273 (or 283) may be provided so that opening and closing the control valve 273 (or 283) will modify the volume of the positive chamber 270 (negative chamber 280) and thus the spring characteristic of the spring unit 260.

It is also possible for the suspension fork 114 to comprise in the suspension piston 37 one control valve 293 only which is connected with the control device 60 via a cable or a control line 294. Opening the control valve 293 enables gas exchange in any desired axial position of the suspension piston 37. Pressure compensation in a suitable position modifies the rest position and results e.g. in lowering, or in transfer to the normal position, of a lowered suspension fork.

Suitably controlling the control valves may also influence the pressure level in the positive chamber and/or the negative chamber.

FIG. 3B shows a simplistic cross-sectional view of a shock absorber 100 which is presently employed for example in the rear wheel damper 115.

The shock absorber 100 comprises a damper device 1. The shock absorber 100 is fastened by the first end serving as the component 101 and the second end serving as the component 102, to different parts of the supporting structure 120 or the frame 113 for damping relative motions.

In the damper housing 2 a damping piston unit 40 is provided which comprises a damping piston 5 with a damping valve 8 and a piston rod 6 linked therewith. The damping piston 5 is provided with the magnetorheological damping valve 8 therein which presently comprises a field generating device 11 and in particular an electric coil for generating a suitable field intensity. The magnetic field lines run in the central region of the core 41 approximately perpendicular to the longitudinal extension of the piston rod 6 and thus pass through the damping ducts 20, 21 approximately perpendicular (see FIG. 4). This causes the magnetorheological fluid present in the damping ducts 20 and 21 to be effectively influenced so as to allow efficient damping of the flow through the damping valve 8. The shock absorber 100 comprises a first damper chamber 3 and a second damper chamber 4 separated from one another by the damping valve 8 configured as the piston 5. In other configurations an external damper valve 8 is possible which is disposed external of the damper housing 2 and connected via supply lines.

The first damper chamber 4 is followed toward its end 102 by the equalizing piston 72 and thereafter the equalizing space 71. The equalizing space 71 is preferably filled with a gas and serves to equalize the piston rod volume which in compressing enters into the entire damper housing 2.

Magnetorheological fluid 9 serving as the field-sensitive medium is present not only in the damping valve 8 but presently in the two damping chambers 3 and 4 on the whole.

The flow duct 7 between the first damper chamber 3 and the second damper chamber 4 extends, starting from the second damper chamber 4, firstly through the fan-type damping ducts 20 and 21 which at the other end lead into the collection chamber 13 or collection chambers 13. The magnetorheological fluid collects there after exiting the damping ducts 20, 21 before passing through the flow apertures 14, 15 into the first damping chamber 3. In compressing, i.e. in the compression stage, flow passes through all of the flow apertures 14, 15. This means that the major portion of the flow presently passes through the flow apertures 15 and the one-way valves 17 at the flow apertures 15 automatically open such that the magnetorheological fluid can pass out of the second damper chamber 4 into the first damper chamber 3.

In the compressed state illustrated the first damper chamber 3 is radially entirely surrounded by the second spring chamber 28 of the spring device 26. This allows a particularly compact structure.

The shock absorber 100 comprises an equalizing device 290 which enables pressure compensation between the positive chamber 270 and the negative chamber 280. The position of pressure compensation is adjustable. To this end the equalizing device 290 may comprise e.g. a telescopic equalizing plunger 291 which can extend out of the spring piston 37 to different lengths. Thus the extendable equalizing plunger 291 will sooner (or later) reach a stopper at the end of the negative chamber 280. The equalizing device 290 may be connected with the control device 60 by electric cable 294. As the equalizing plunger 291 abuts, it opens a fluid opening so as to cause gas compensation and thus pressure compensation between the positive chamber 270 and the negative chamber 280.

In rebounding the equalizing device 290 will automatically close again. Depending on the compensating position, the pressure relationships set at the fluid spring 261 differ so as to influence the suspension accordingly. It is also possible to provide the end of the negative chamber 280 with an adjustable or displaceable stopper for a stationary equalizing plunger 291 to obtain variations of the spring characteristic. Alternatively or in addition, a length-adjustable stopper 297 may be provided against which the equalizing plunger 291 abuts in an adjustable and variable position 292 or 296. As the equalizing plunger 291 abuts, the equalizing plunger 291 opens the control valve 293 or forms a flow aperture through which the pressure can be compensated between the positive chamber and the negative chamber. FIG. 3B shows a position 292 with extended equalizing plunger 291. The equalizing plunger 291 may be retracted so as to obtain another position 296 in which the equalizing device 290 opens.

Furthermore an electrically controlled equalizing valve 293 which may be supplied with energy via the electric cable 294 may be provided to compensate part or all of the pressure in suitable positions between the positive chamber 270 and the negative chamber 280.

The equalizing plunger 291 is preferably spring-loaded.

Furthermore, the positive chamber 270 may include a number of chamber sections 271, 272. In addition to the basic chamber being the chamber section 271, the chamber section 272 may be activated as needed or required for changing and in particular reducing the spring hardness. Or else the chamber section 272 may be deactivated and separated from the chamber section 271 when the spring hardness is to be changed and in particular increased.

In analogy the negative chamber 280 may consist of a number of chamber sections 281, 282. In addition to the first chamber section 281 the second chamber section 282 may be activated as needed or required. Correspondingly the chamber section 282 can be deactivated and separated from the chamber section 281. In another configuration the positive chamber 270 comprises chamber sections 271 and 272, and the negative chamber 280 comprises chamber sections 281 and 282. In this configuration the equalizing device 290 comprises control valves 273, 283 and 263 and a connecting line 265 for interconnecting the chamber sections 272 and 282 as required. When the three control valves 273, 283 and 263 open then the pressure will be compensated between the positive chamber 270 and the negative chamber 280. The position 292 of pressure compensation can be selected as desired and independently of an equalizing plunger 291. Therefore this configuration does not require any equalizing plunger 291 nor any control valve 293 in the piston 37, nor any adjustable stopper 297.

The chamber sections may in all the cases be activated and deactivated in compressing or rebound in dependence on the position.

The spring piston 37 is provided at the end of the damper housing 2. Disposed thereat is a holder 73 supporting a magnet 74. The magnet 74 is part of a sensor 47. The sensor 47 comprises a magnetic potentiometer which captures a signal that is representative of the position of the magnet 74 and thus of the spring piston 37. This potentiometer 47 does not only permit to determine a relative location but presently also permits to determine the absolute stage of compression or rebound of the shock absorber 100. It is also possible to employ an ultrasonic sensor for capturing a distance.

Figure 3C:
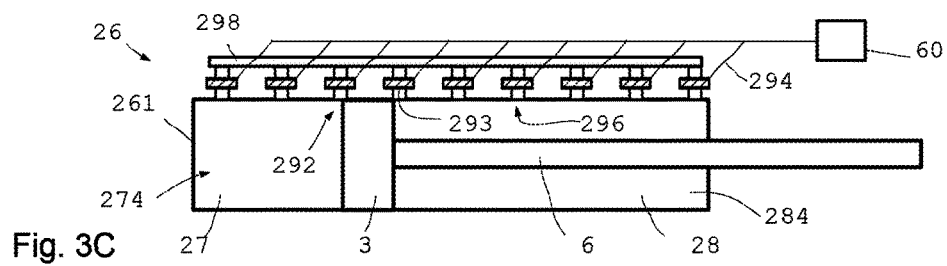
FIG. 3C is a simplistic, sectional view of a detail of the shock absorber of the bicycle according to FIG. 1.

FIG. 3C shows a simplistic illustration of a suspension device 26 of a rear wheel damper 115 and in particular of the suspension fork 114 in FIG. 3A. The shock absorber 100 comprises a spring unit 260 configured as a fluid spring 261 which in turn comprises a positive chamber 27 and a negative chamber 28. The positive chamber 27 and the negative chamber 28 are provided in a housing having a cylindrical interior and are separated from one another by the suspension piston 37. A piston rod 75 extends outwardly. The positive chamber 27 and the negative chamber 28 show connected thereto at least one compensating line 298 each which is presently disposed externally. Multiple control valves 293 are provided in different axial positions 292, 296 etc. of the suspension piston 37. The control valves 293 are connected with the control device 60 via cables or control lines 294. After two control valves 293 open and the positive chamber 27 and the negative chamber 28 are connected, fluid will exchange between the two chambers 27 and 28. A rest position of the shock absorber 100 is set depending on the axial position in which a control valve 293 opens, thus establishing a connection between the positive chamber 27 and the negative chamber 28. This may be utilized for example for providing one (or more) defined rest positions or lowered positions for different conditions.

Figure 4:
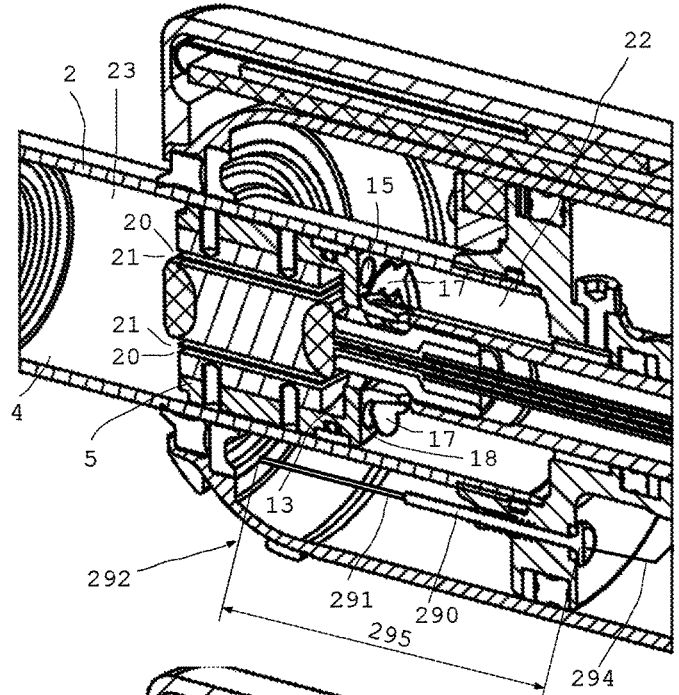
FIG. 4 is a sectional side view of the shock absorber according to FIG. 3B in an enlarged illustration in the compression stage.
Figure 5:
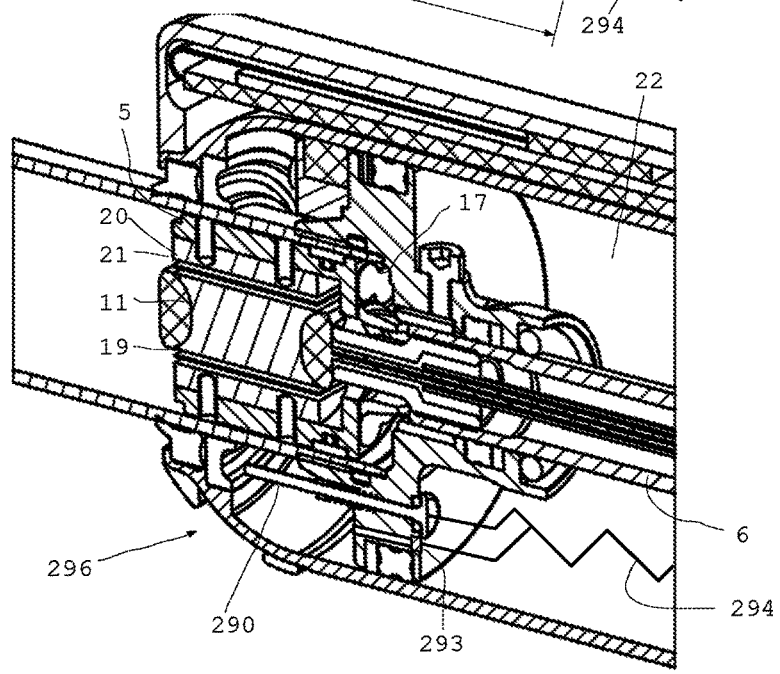
FIG. 5 is an enlarged sectional illustration of the shock absorber in the rebound stage.

FIGS. 4 and 5 show partially enlarged details of the illustration according to FIG. 3B, FIG. 4 illustrating the compression stage and FIG. 5, the rebound stage.

Figure 9:
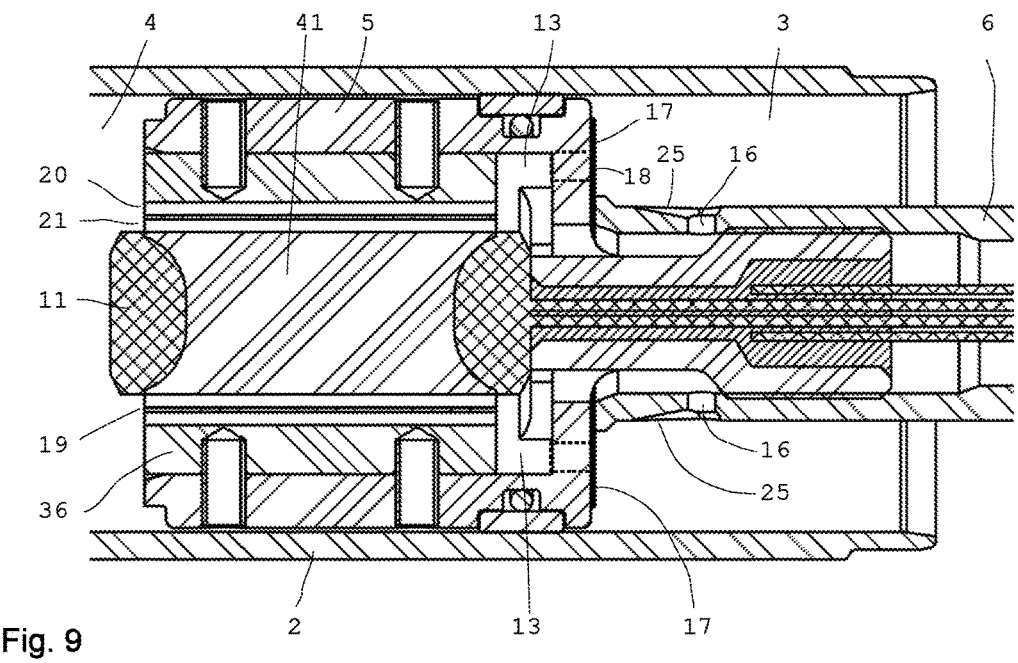
FIG. 9 is an enlarged cross section of the piston unit.

In the compression stage as illustrated in FIG. 4, i.e. in compressing, the magnetorheological fluid 9 emerges from the second damper chamber 4 through the damping ducts 20, 21, entering the damping piston 5. The flow resistance through the damping ducts 20, 21 depends on the magnetic field of the field generating device 11 configured as an electric coil. After leaving the damping ducts 20, 21 the magnetorheological fluid collects in the two collection chambers 13 (see FIG. 9), thereafter passing through the flow apertures 15, which allow passage in the compression stage, with the one-way valves 17. FIG. 4 illustrates the equalizing device 290 in position 291 in which the length 295 of the equalizing device 290 is longer than in the illustration in FIG. 5 in which the telescopic equalizing plunger is fully retracted.

In the rebound stage as illustrated in FIG. 5 the magnetorheological fluid flows from the side 22, the side of the piston rod 6, toward the damping piston 5. The one-way valves 17 at the flow apertures 15 close automatically such that only the flow apertures 14 configured as through holes 16 in the piston rod 6 remain for putting the magnetorheological fluid into the damping piston 5. When the magnetorheological fluid 9 has entered through the through hole 16 into the collection chamber 13 or into the collection chambers 13, the magnetorheological fluid evenly flows through all the fan-type damping ducts 20, 21 until the magnetorheological fluid exits from the damping piston 5 on the other flow side 23. It can also be clearly seen in FIG. 5 that the damping piston 5 comprises an electric coil serving as the field generating device 11, a core 41 of a magnetically conducting material and a ring conductor 36. Furthermore an insulating material 42 may be provided.

The collection chamber 13 enables an efficient series connection of the one-way valves 17, which are in particular configured as shim valves, with the damping ducts 20, 21. The collection chamber 13 serves to avoid in particular inadmissibly high loads on the fan walls 19 due to different pressures in the damper ducts 20, 21. Operating pressures of 30 bars, 50 bars and more can occur which, given different loads on both sides of a fan wall 19 may cause the thin fan walls 19 to be destroyed.

Figure 6:
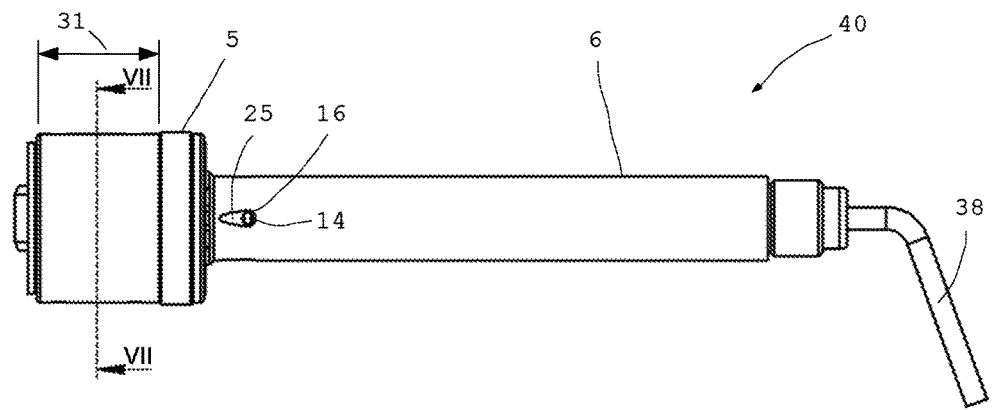
FIG. 6 shows the piston unit of the shock absorber according to FIG. 3B.

FIG. 6 shows a side view of the damping piston unit 40 with the damping piston 5 and the piston rod 6 from the end of which the cable 38 protrudes. The length 31 of the damping ducts 20, 21 is exemplarily tightened. In this illustration one can clearly see the flow aperture 14 configured as a through hole 16 with the inclined inlet 25 following, which provides for an automatically increasing end position damping. When the shock absorber 100 rebounds nearly entirely, then the spring piston 37 firstly slides across the flow aperture 16 and thereafter across the inlet 25, so as to have the flow cross-section continually decreasing and thus the damping force automatically increasing.

Figure 7:
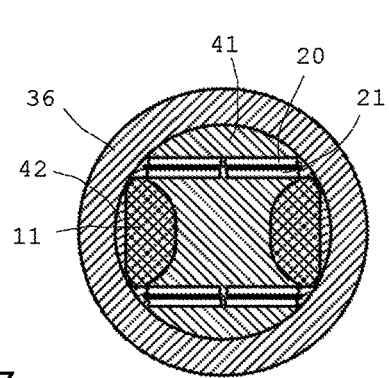
FIG. 7 is a cross section taken along the line VII-VII in FIG. 6.

FIG. 7 shows the cross-section A-A in FIG. 6. The core 41 is surrounded by the field generating device 11 configured as a coil. Damping ducts 20 and 21 are disposed in the core. The core and the coil are radially surrounded by ring conductors 36.

Figure 8:
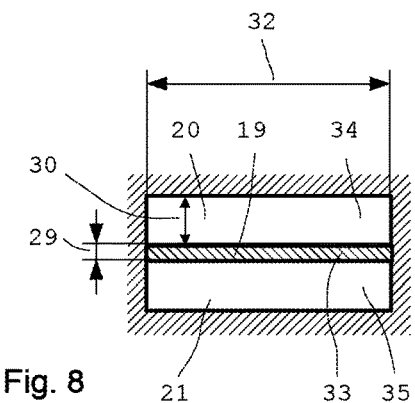
FIG. 8 is a diagrammatic figure of the fan-like damping ducts.

FIG. 8 shows an enlarged illustration of the damping ducts 20, 21 provided in the core 41. The fan-type damping ducts 20, 21 are separated from one another by a fan wall 19. A wall thickness 29 of the fan wall 19 is less than a height 30 of a damping duct 20 or 21. The cross-sectional area 33 of the fan wall 19 is again considerably smaller than is the cross-sectional area 34 or 35 of the damping ducts 20 or 21. In the illustrated example the wall thickness 29 of the fan wall 19 is approximately 0.3 to 0.6 mm. The clear height 30 of the damping ducts 20 or 21 is larger, being 0.5 mm to 0.9 mm.

Values for damping ducts 20, 21 of a rear wheel damper 115 are typically, without being limited to, duct lengths 31 between approximately 10 and 30 mm, duct widths between approximately 5 and 20 mm, and duct heights between approximately 0.2 and 1.5 mm. Up to ten damping ducts 20, 21 may be present which may in turn be combined to form one or more groups. Within such a group the damping ducts 20, 21 are separated from one another by fan walls 19 whose wall thicknesses are typically between 0.2 and 1 mm.

The clear flow cross-section, being the sum total of all the damping ducts 20, 21, largely depends on the duct shape, the fluid employed, the piston surface, and the desired range of force. The clear flow cross-section typically lies in the range between 10 and 200 square millimeters.

Figure 10:
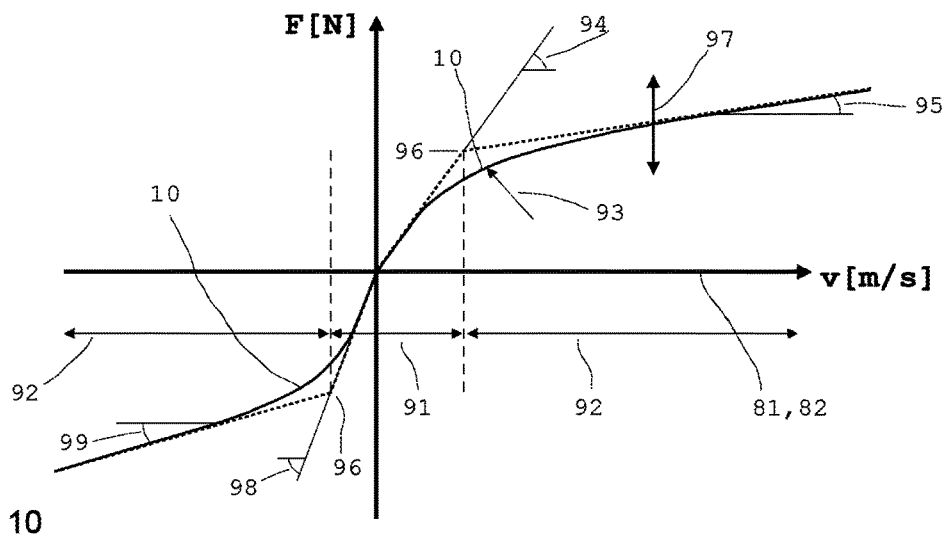
FIG. 10 is a first schematic illustration of a characteristic damper curve for the shock absorber according to FIG. 3B.

FIG. 10 shows a characteristic damper curve 10 of the shock absorber 100 according to FIG. 3A or FIG. 3B with the damping valve 8 in a force-speed diagram. The low-speed range 91 and the high-speed range 92 are connected with a radius 93 by way of a gentle rounding. The characteristic damper curve 10 is presently asymmetric. Although the characteristic damper curve 10 basically shows similar curve paths for the compression and rebound stages, the gradient in the rebound stage is specified to be steeper than in the compression stage.

The characteristic damper curve 10 is set electrically in real time at all times, taking into account the hydraulic basic damping, such that in each instance of a shock or event or each disturbance 85 a suitable damping force 84 is set even while the shock 85 or the disturbance is still occurring.

The gradient 94 of the presently shown characteristic damper curve 10 in low-speed range 91 can be well approximated both for the compression stage and the rebound stage, by way of a straight line showing a substantially linear gradient 94 or 98. The characteristic damper curve 10 presently shown runs through the origin of coordinates such that, given a relative speed of the damper piston 5 of zero, there is no damping force. This allows a very soft and agreeable responsivity.

In the high-speed range 92 the gradients 95 and 99 are presently also specified as substantially linear. Curved intermediate sections 93 may extend in-between so as to avoid break points 96. Or else a linear intermediate section 93 or multiple linear or slightly curved intermediate sections 93 may be provided to approximate a curved path.

Furthermore an arrow 97 is plotted, indicating the effect of a magnetic field having different strengths. Given a higher magnetic field strength the characteristic damper curve shifts upwardly while with a weaker magnetic field it shifts downwardly.

A characteristic damper curve with no intermediate section 93 provided is plotted in a dotted line so as to result in more or less noticeable break points at the points 96. Such a characteristic damper curve can readily be fitted by dragging the original characteristic damper curve in predetermined or else freely chosen points. Comfortable embodiments may provide such setting by touching with a finger or a stylus and dragging to the desired shape.

The gradients 94 and 98 in the low-speed range 91 and the gradients 95 and 99 in the high-speed ranges 92 are automatically or manually modifiable and adaptable to the current preferences and conditions, as is the entire characteristic damper curve 10. In this way, as a different ground is recognized, a different characteristic damper curve can be selected automatically, specifying softer or else harder damping. Independently of the selected characteristic damper curve, each and every shock is at all times dampened in real time.

The gradients 95 and 99 in the respective high-speed ranges 92 are initially specified but they can be changed as needed any time. The power supply for the control device and the electric coil serving as the field generating device 11 may also be provided by a battery, an accumulator, a generator, dynamo, or in particular a hub dynamo.

Figure 11A:
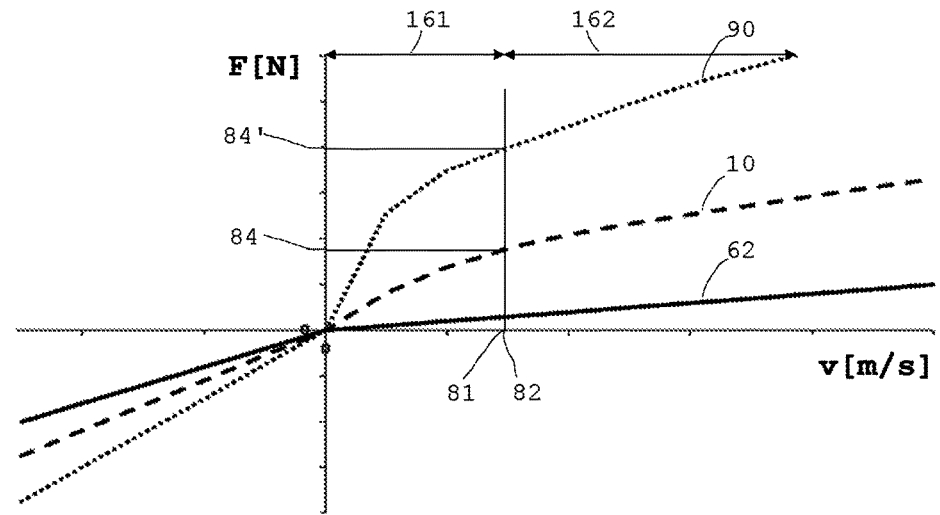
FIG. 11A is a schematic illustration of the basic hydraulic curve of the shock absorber according to FIGS. 3A and 3B and two different characteristic damper curves.

FIG. 11A illustrates the basic curve 62 and two different characteristic damper curves 10 and 90. It shows the damping force plotted over the speed ratios of the components 101 and 102 relative to one another. The components 101 and 102 may be the two ends of a shock absorber or else represent the frame and the wheel.

The basic characteristic curve 62 represents the hydraulic properties of the shock absorber 100 where no magnetic field is applied. The gradients of the basic curve 62 in the compression stage and in the rebound stage differ due to the one-way valves 17 and in the rebound stage they are steeper than in the compression stage.

The characteristic damper curves 10 and 90 are asymmetric in FIG. 11A. The characteristic damper curves 10 and 90 represent the resulting damping forces over the relative speed and they are composed of the damping force of the basic curve 62 and the magnetically generated damping force. This means that, given a specific compressing or rebounding speed, a damping force cannot be set lower than the damping force of the basic curve 62. The basic curve 62 must be taken into account in designing. Weaker damping is not possible due to the principle. On the other hand, given a particularly small difference between a characteristic damper curve 10 and the basic characteristic curve 62, the electric energy required is particularly low such that a certain adaptation of the basic characteristic curve 62 to the softest characteristic damper curve provided is useful. The softest characteristic damper curve provided may e.g. be the characteristic damper curve 10.

A basic characteristic curve 62 with "useful" properties ensures reasonable emergency running properties in case that the power supply ceases to provide sufficient energy. Also possible and preferred is a mechanically adjustable emergency valve to provide adjustable emergency running properties.

In the illustrated characteristic damper curve the gradients in the compression stage and the rebound stage are different. In the rebound stage the gradient 96 is approximately linear on the whole. In the rebound stage there is virtually no differentiation between the low-speed range 91 and the high-speed range 92.

In the compression stage, however, the low-speed range 91 and the high-speed range 92 show different gradients 94 and 95 in both the plotted characteristic damper curves 10 and 90.

The control device 46 periodically scans the sensor 47 at short, equidistant time intervals of e.g. 1 ms, 2 ms or 5 ms. The control device 46 computes from the signals a current characteristic value 81 for the characteristic value 82. The characteristic value 82 in this embodiment corresponds to the relative speed 82 of the relative motion of the first component versus the second component. It is possible for the control device 60 to obtain from the sensor signals a relative speed 82 to be employed for the current characteristic value 81. In the simplest of cases the sensor 47 directly obtains the associated relative speed. In another simple case the sensor 47 or the control device 46 obtains from the sensor signals a change in path or position of the components 101 and 102 relative to one another. When the time interval between two measurements is known, a relative speed 82 and thus a current characteristic value 81 can be derived therefrom. If the time interval between two measurements is substantially constant, a change in position or relative motion may be directly used as the current characteristic value 81.

It is also possible to obtain from values from acceleration sensors or from a set of parameters of multiple different sensor values, a current characteristic value 81 which is representative of the current relative speed 82. One embodiment provides for the data from acceleration sensors and/or displacement sensors to be coupled such that on the one hand, quick responses are possible to rapid changes due to jumps or roughness of road, and on the other hand, precise positioning and speed sensing is achieved in slower actions.

With the current characteristic value 81 thus obtained, the associated damping force 84 or 84' is obtained by means of the characteristic damper curve 10 or e.g. 90 stored in a memory device. The associated magnetic field and the associated current intensity of the coil 11 are derived and adjusted in real time. This means that a cycle is completed within 20 ms and as a rule within 10 ms. Measurements may be taken more frequently, e.g. at time intervals of 5 ms or even at time intervals of 1 or 2 ms or faster still. The control device 60 processes the sensor signals received, generating by means of the coil 11 a magnetic field of a suitable field intensity for generating the damping force pertaining to the current characteristic value 81. The magnetic field acts within the provided cycle time of e.g. 10 ms, setting the desired damping force 84.

If the relative speed 82 has changed after another measuring period, a correspondingly different magnetic field is generated such that the control cycle consisting of sensor 47, control device 46 and damping valve 8 serving as the actor observes the desired response time, adapting the system in real time.

Figure 11B:
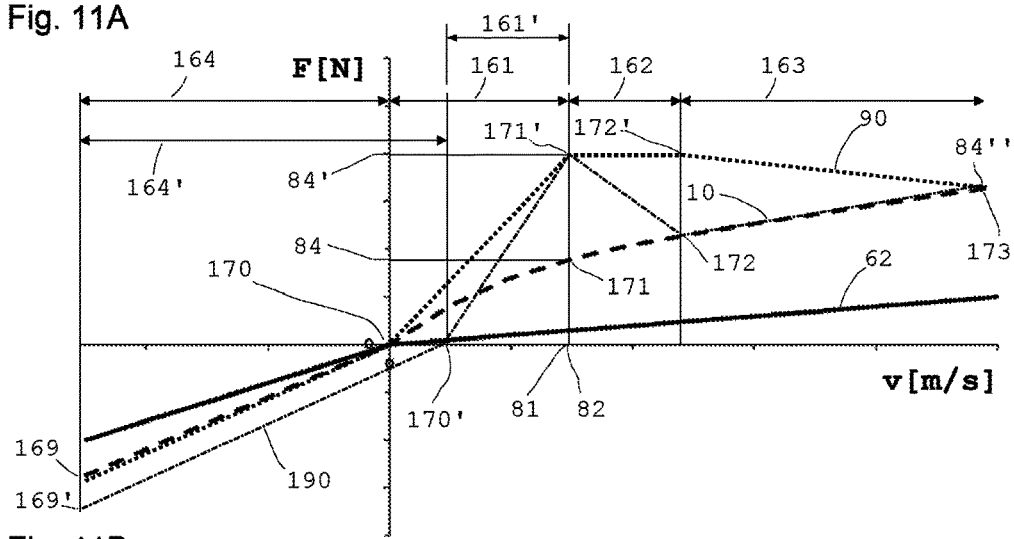
FIG. 11B is a schematic illustration of another characteristic damper curve.

FIG. 11B illustrates the characteristic damper curve 10 from FIG. 11A. Furthermore, a characteristic damper curve 90 is shown which has been generated from the characteristic damper curve 10 for example by dragging the points 169, 170, 171, 172 and 173 or by modifying single sections of the characteristic curve 161, 162, 163 and 164.

FIG. 11B shows another illustration of characteristic curves. For example the content of FIG. 11B may be shown on a graphical display and a touch-sensitive display 57. For example if the characteristic damper curve 10 from FIG. 11B is captured in the point 171 and locally dragged toward the point 171', then the characteristic curve will thereafter show a considerably steeper incline from zero. When the characteristic curve is thereafter dragged from the point 172 to the point 172', this will result in a linear path between the points 171' and 172' on the new characteristic curve 90 where the damping force virtually does not change. The characteristic damper curves 10 and 90 rejoin at the point 173. Thus, the new characteristic damper curve 90 will be the path plotted in the dotted line where the characteristic damper curve 90 has been modified in the sections 161, 162 and 163. The section 164 remains unchanged. The path of the characteristic damper curve 90 is independent of the path of the characteristic damper curve 10. This means that the sections 161, 162, 163 and 164 of the characteristic damper curve path are basically independent of one another. Thus, damping may be weaker in the section 163 than in the section 162, as it is plotted. This cannot be readily achieved with conventional shock absorbers since the flow resistance and thus the damping force increases as the flow speed increases. In particular can the path of the characteristic damper curve 90 be modified in the rebound stage independently of the path of the characteristic damper curve 90 in the compression stage.

Moreover, changes to the spring characteristics can influence the entire system so as to enable further manual or automatic adaptations. The suspension fork may be lowered or the pressure and/or the spring hardness in the positive chamber and/or the negative chamber is increased or decreased, in relation to the rider's weight and further conditions. Damping characteristics may be set when the suspension fork is lowered which are identical to those in a non-lowered position. The control device automatically takes into account and compensates differences due to different air pressures.

When a high relative speed 82 has been measured the shock absorber 100 even allows to reduce the damping force 84 by way of reducing the effective magnetic field at the electric coil device 11 for example by reducing the current intensity.

The characteristic damper curve 90 may be stored and/or modified further as desired. The point 170 lies at the zero passage of force and it also describes the zero passage of the relative speed.

Another characteristic damper curve 190 can be readily set by dragging or modifying the points. The point 169 has shifted toward the point 169'. The zero passage at the point 170 may likewise be shifted toward the point 170' toward positive (or else negative) relative speeds. In this way the section 164' is increased and the section 161' is reduced. It is further shown that the point 171' was left in place and the point 172' was dragged back to the point 172. Now if the point 173 remains unchanged, the illustrated dash-dotted path of the characteristic damper curve 190 will result. This shows illustratively that the rebound stage and the compression stage can be adjusted separately from one another. Measurements have shown that in bicycle dampers, response and cycle times of 10 or 20 ms are entirely sufficient for adjusting damping in real time.

Figure 12:
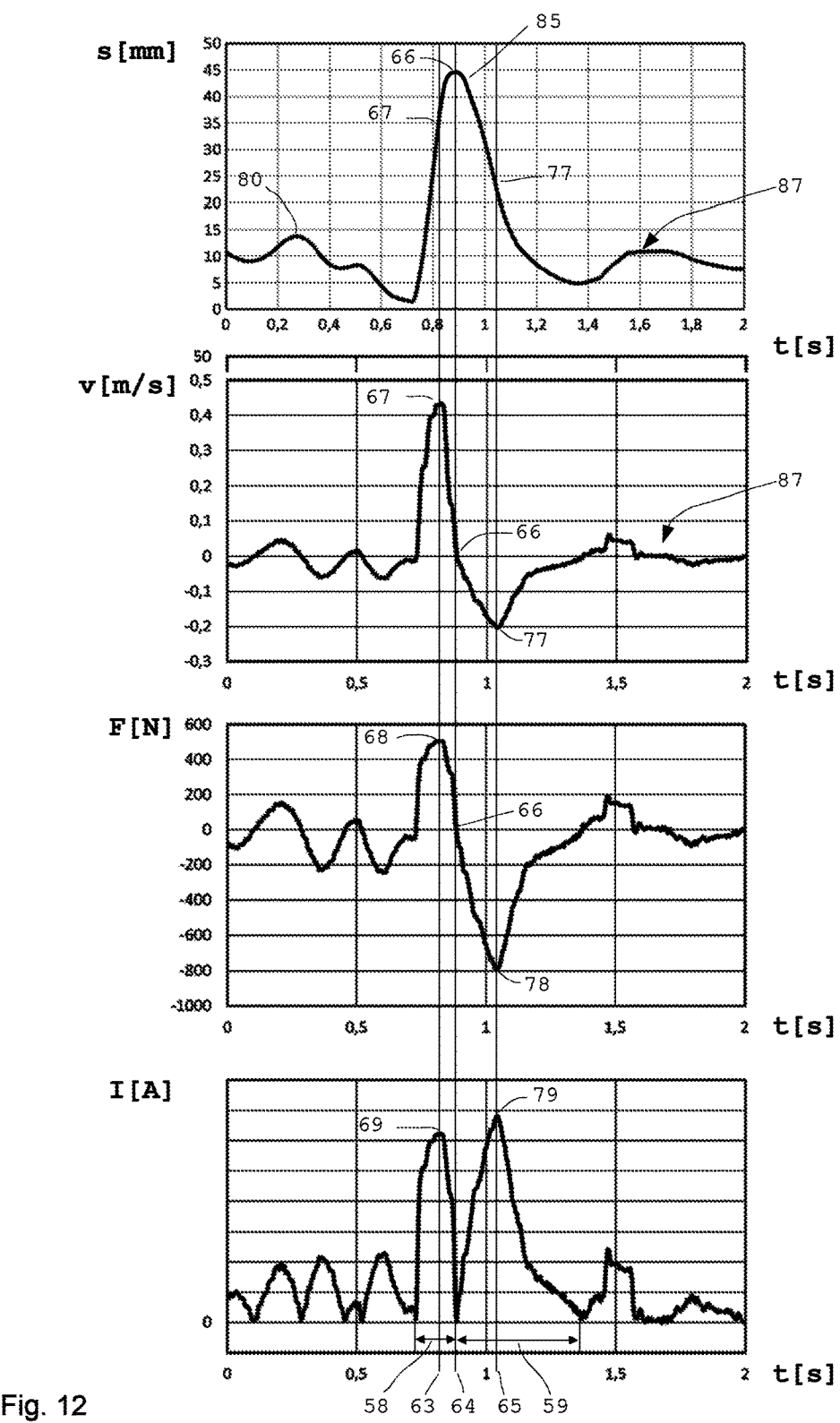
FIG. 12 is the time curve of the suspension travel, the piston speed, the damping force, and the applied current intensity, of the shock absorber according to FIG. 3B during a jump.

This is also shown in the data of an actually measured and dampened jump as illustrated in FIG. 12.

FIG. 12 shows, one above the other in a number of separate diagrams over time the relative motion 80 and the measurement and control data recorded during a jump performed with a bicycle. The characteristic damper curve employed corresponds e.g. to the characteristic damper curve 10 in FIG. 10. If a characteristic damper curve 90 from FIG. 11B were used, the paths would be completely different even in identical initial jump conditions!

The topmost diagram illustrates the suspension travel in millimeters over time in seconds with the entire time scale only showing 2 seconds. Beneath, the relative speed, the damping force, and the current intensity are illustrated accordingly over the same time interval. When another rider uses the bicycle then the spring characteristics and corresponding damping control can generate a precisely identical behavior, independently of the rider's weight.

As the jump begins, the shock absorber 100 is located inside the SAG position, being compressed about 12 mm. During the jump which is the event 85 the shock absorber 100 rebounds such that the damping piston 5 is in nearly complete rebound at approximately 0.75 seconds. Measurements are taken in very short time intervals 87.

After touchdown on the ground the rear wheel begins compressing, obtaining a maximum compressing speed and thus relative speed 67 in the compression stage which occurs at approximately 0.8 seconds and presently achieves values above 0.4 m/s. At the same time the maximum damping force 68 of presently approximately 500 N is generated at the maximum of the current intensity 69 in the compression stage.

A very short time later the maximum compression 66 is reached at the time 64 when the relative speed 67 reaches zero. Accordingly the control device reduces the electric current intensity to zero such that the damping force is zero.

Thereafter the rebound stage damping follows while the shock absorber 100 rebounds once again. At the same time the electric current intensity increases accordingly for setting a damping force corresponding to the relative speed 67 according to the set characteristic damper curve.

The maximum relative speed 77 will occur in the rebound stage at the time 65 which presently results in a maximum current intensity 79 for generating a maximum damping force 78 of approximately 600 N.

The duration of the jump results from the duration 58 of the compression stage of approximately 0.2 seconds and the duration 59 of the rebound stage of approximately 0.5 seconds, plus the preceding rebound phase.

It immediately follows from the durations indicated that a regulating speed of 250 ms is not sufficient. In order to operate in real time, the system must respond within at least 50 ms and better within 20 ms which is presently ensured.

The regulating speed including capturing a sensor signal, deriving a characteristic value, adjusting the current intensity, and setting the damping force 84, is presently less than 10 ms. Thus the control cycle 12 or the control loop is passed through about 200 times within the time period illustrated in FIG. 12.

The characteristic damper curve which can be adjusted graphically allows to adapt the characteristic damper curve as desired to one's own requirements or simply to adopt a characteristic damper curve from third parties.

In all the operating modes of the shock absorber 100 the sensor device 47 employed is preferably at least one displacement sensor. The sensor device 47 is preferably read e.g. at a frequency of 2 kHz and a resolution of 12 bits. In theory, given a stroke length of a rear wheel damper 115 of 50 mm, the relative motion can be determined once in every 0.5 ms at an accuracy of 12 μm. Unlike thereto, a suspension fork 114 shows a stroke length of e.g. 150 mm, such that under the same conditions a relative motion can be determined at an accuracy of 36 μm.

The data captured by means of the sensor device 47 preferably pass through a low-pass filter and are used for computing the speed wherein a specific damping force is computed by way of the current speed, direction, and the preset characteristic damper curve. This computing operation is repeated e.g. at 500 Hz such that a new force specification is generated once in every 2 ms. An electric current to be set is obtained from the damping force based on the known correlation between the damping force and the field intensity required therefor and in turn the current intensity required therefor. In particular a dedicated electric current regulator sets the respective electric current at the electric coil device on the shock absorber by way of this specified force such that the resulting damping force is traced sufficiently fast and substantially corresponds to the specification.

The conversion of a relative motion measured by analog meter to a digital signal and the subsequent computing of the electric current specification or the electric current to be set requires hardly any resources, and using a state-of-the-art microcontroller it can be done in a matter of mere microseconds. The electric current regulator provides adequately fast response of the electric coil device such that, notwithstanding inductivity and eddy currents, an electric current jump from 0 to 100% is possible in very few milliseconds.

What is advantageous for the responsivity of the electric current regulator is, the low-pass filter and computation of the relative speed wherein a compromise must be found between fast response and filter effect. The filter parameters may be dynamically adapted to the prevailing situation.

Given fast filtering, a relative motion or change in position will in the worst case scenario be recognized in the subsequent regulating pulse after 2 ms and will then be processed within a few microseconds. The current regulator will work virtually instantly toward implementing the new specification of current. The damping force acts with some delay following the specification of electric current. The response time of the magnetorheological fluid (MRF) is less than 1 ms. The rigidity of the system is also of minor importance. Depending on the concrete structure the new nominal value of the damping force is obtained within a few milliseconds. Jump response times of less than 10 ms are readily feasible with the system and have been verified successfully in the past. Depending on the requirements and disposable manufacturing costs, faster components may be employed which allow jump response times in the region of one-digit milliseconds.

Regulation, i.e., closed-loop control, may also be based on fuzzy logic and/or learning.

Preferably all the dampers may be linked electrically to form one system. In this case e.g. relevant data are transmitted from a first damper to a second damper in real time so as to better adapt to the event. For example the damper in the suspension fork can transmit the information to the rear wheel damper for the latter to anticipate e.g. a severe shock. The entire system will thus be more efficient. Also/or a hydraulic link of two or more dampers is possible (open or closed hydraulic system).

The damper device may comprise two or more controllable damping valves having one (or multiple) field generating device(s). These may be attached external of the components which move relative to one another. It is also possible to provide at least one permanent magnet which generates a static magnetic field. The strength of the magnetic field effectively acting in the damping valve can then be modulated in real time by the magnetic field generated by the electric coil serving as the field generating device.

On the whole the invention provides a suspension control and an advantageous bicycle allowing to control both a rear wheel shock absorber and a suspension fork. Different basic damping in the compression and/or rebound stages is enabled in a simple way. The difference depends on the orientation of the one-way valves in the flow apertures. In this way a flexible and comprehensive adaptation to many different requirements can be ensured. Controlling takes place in real time so as to provide prompt and immediate response to all the occurring events, disturbances, shocks or obstacles.

Operation is both flexible and still simple. Changes to the shock absorber are possible even while riding downhill or while riding through open terrain while offering comfortable coarse and fine adjustment options of the damper settings. It is possible to lower the suspension fork and to set the rest position. In the case of multiple chamber sections the suspension hardness and the pressure level may be changed within limits.

The following is a summary list of reference numerals and the corresponding structure used in the above description of the invention:

| | |
|---|---|
| 1 | damper device |
| 2 | damper housing |
| 3 | first damper chamber |
| 4 | second damper chamber |
| 5 | damping piston |
| 6 | piston rod |
| 7 | damping duct, flow duct |
| 8 | damping valve |
| 9 | MRF |
| 10 | characteristic damper curve |
| 11 | electric coil device |
| 12 | control cycle |
| 13 | collection chamber |
| 14, 15 | flow aperture |
| 16 | through hole |
| 17 | one-way valve |
| 18 | valve opening |
| 19 | fan wall |
| 20, 21 | damping duct |
| 22, 23 | flow side |
| 24 | flow direction |
| 25 | inlet |
| 26 | suspension device |
| 27 | positive chamber |
| 28 | negative chamber |
| 29 | wall thickness |
| 30 | clear extension |
| 31 | length |
| 32 | width |
| 33-35 | cross-sectional area |
| 36 | ring conductor |
| 37 | spring piston |
| 38 | cable |
| 40 | damping piston unit |
| 41 | core |
| 42 | insulating material |
| 45 | memory device |
| 46 | control device |
| 47 | damper sensor, sensor |
| 48 | data |
| 49 | display |
| 52 | step |
| 53 | internet |
| 54 | network interface |
| 55 | radio network interface |
| 56 | step |
| 57 | touchscreen, graphical control unit |
| 58 | duration compression stage |
| 59 | duration rebound stage |
| 60 | control device |
| 61 | battery unit |
| 62 | basic characteristic curve |
| 63-65 | time |
| 66 | max. compression |
| 67 | relative speed |
| 68 | max. damping force |
| 69 | max. electric current intensity |
| 70 | step |
| 71 | equalizing space |
| 72 | equalizing piston |
| 73 | holder |
| 74 | magnet |
| 75 | piston rod |
| 77 | max. relative speed |
| 78 | max. damping force |
| 79 | max. electric current intensity |
| 80 | relative motion |
| 81 | characteristic value |
| 82 | relative speed |
| 84 | damping force |
| 85 | event |
| 87 | time interval |
| 90 | characteristic damper curve |
| 91 | low-speed range |
| 92 | high-speed range |
| 93 | transition region |

-continued

| | |
|---|---|
| 94, 95 | gradient |
| 96 | break point |
| 97 | arrow |
| 98, 99 | gradient |
| 100 | shock absorber |
| 101 | component |
| 102 | component |
| 111 | wheel, front wheel |
| 112 | wheel, rear wheel |
| 113 | frame |
| 114 | suspension fork |
| 115 | rear wheel damper |
| 116 | handlebar |
| 117 | saddle |
| 120 | supporting structure |
| 150 | operating device |
| 151 | actuating device |
| 152 | adjustment device |
| 153 | mechanical input unit |
| 154-156 | operating member |
| 160 | smartphone |
| 161-164 | area |
| 169-173 | point |
| 169'-173' | point |
| 190 | characteristic damper curve |
| 200 | two-wheeled vehicle, bicycle |
| 260 | spring unit |
| 261 | fluid spring |
| 263 | control valve |
| 265 | line |
| 270 | positive chamber |
| 271, 272 | chamber section |
| 273 | control valve |
| 274 | fluid volume |
| 280 | negative chamber |
| 281, 282 | chamber section |
| 283 | control valve |
| 284 | fluid volume |
| 290 | equalizing device |
| 291 | equalizing plunger |
| 292, | position |
| 293 | equalizing valve |
| 294 | cable, control line |
| 295 | length |
| 296 | position |
| 297 | stopper |
| 298 | compensating line |
| 300 | suspension control |

The invention claimed is:

1. A suspension control system for an at least partially muscle-powered two-wheeled vehicle, the suspension control system comprising:

at least one damper device and at least one spring device for sprung damping a relative motion between a first component and a second component of the vehicle;

said at least one damper device having a damping characteristic;

said at least one spring device having at least one spring unit with a variable spring characteristic;

at least one electrically operated actuator configured to vary the spring characteristic of said spring unit; and an electric control device for controlling said actuator;

said damper device containing magnetorheological fluid and including at least one magnetorheological damping valve, said damping valve has a damping characteristic that is adjustable by said electric control device, and wherein the damping characteristic of said damping valve and the spring characteristic of said spring unit are adjustable by way of said electric control device; and a memory device configured to define, together with said control device, at least one characteristic damper curve being a function of a damping force over a relative speed between the first and second components;

at least one sensor device connected to said control device and configured for periodically obtaining a current characteristic value of a current relative speed between the first and second components; and said control device being configured to derive, from the current characteristic value and the characteristic damper curve stored in said memory device, a pertaining current setting for said controllable damping valve and to set said damping valve accordingly to adjust a current damping force ensuing from the characteristic damper curve based on the current characteristic value thus obtained.

2. The suspension control system according to claim 1, wherein said electrically operated actuator comprises at least one control valve or at least one adjustment device.

3. The suspension control system according to claim 1, wherein said spring unit comprises at least one fluid spring provided with a compressible fluid.

4. The suspension control system according to claim 3, wherein said fluid spring includes a positive chamber containing compressible fluid and a negative chamber containing compressible fluid, and wherein said positive chamber is bounded by a suspension piston.

5. The suspension control system according to claim 4, which comprises an adjustable equalizing device including at least one actuator of said at least one actuator and wherein said control device is configured to control a fluid exchange between said negative chamber and said positive chamber by way of said equalizing device.

6. The suspension control system according to claim 5, wherein said suspension piston has at least two axial positions and wherein the fluid exchange between the negative chamber and the positive chamber is controlled at said at least two axial positions of said suspension piston.

7. The suspension control system according to claim 5, wherein said equalizing device is configured to connect said negative chamber with said positive chamber in an adjustable position thereof.

8. The suspension control system according to claim 5, wherein a length and/or a position of said equalizing device is adjustable.

9. The suspension control system according to claim 5, wherein said equalizing device includes at least one equalizing plunger.

10. The suspension control system according to claim 4, wherein at least one of a fluid volume in said positive chamber or a fluid volume in said negative chamber is changed by way of electric control.

11. The suspension control system according to claim 10, wherein one or both of the following is true:
said positive chamber of said fluid spring is formed with at least two chamber sections configured to be connected with, and separated from, one another by way of at least one electrically controlled control valve; and
said negative chamber of said fluid spring is formed with at least two chamber sections configured to be connected with, and separated from, one another by way of at least one electrically controlled control valve.

12. The suspension control system according to claim 4, which comprises at least one switchable control valve is provided.

13. The suspension control system according to claim 4, wherein said positive chamber and said negative chamber are connectible via at least one compensating line, and wherein said at least one actuator includes a plurality of electrically switchable control valves provided in different positions.

14. The suspension control system according to claim 4, which comprises a sensor device disposed to acquire a relative position between the first and second components and connected to said control device, and wherein said control device is configured to adjust a fluid pressure of the compressible fluid in at least one of said positive chamber or said negative chamber by controlled opening and closing of at least one control valve.

15. A bicycle, comprising:
a supporting structure having a frame, a steering device, and two wheel mounting positions at said supporting structure for receiving two wheels; and
at least one suspension control system according to claim 1 for springing and damping a relative motion of at least one of said wheels relative to said supporting structure.

16. A suspension control system for an at least partially muscle-powered two-wheeled vehicle, the suspension control system comprising:
at least one damper device and at least one spring device for sprung damping a relative motion between a first component and a second component of the vehicle;
said at least one damper device having a damping characteristic;
said at least one spring device having at least one spring unit with a variable spring characteristic;
at least one electrically operated actuator configured to vary the spring characteristic of said spring unit; and
a control device for controlling said at least one damper device, said control device being configured to set a characteristic damper curve with a lesser damping force at a higher relative speed between the first and second components and with a greater damping force at a lower relative speed between the first and second components.

17. A suspension control system for an at least partially muscle-powered two-wheeled vehicle, the suspension control system comprising:
at least one damper device and at least one spring device for sprung damping a relative motion between a first component and a second component of the vehicle;
said at least one damper device having a damping characteristic;
said at least one spring device having at least one spring unit with a variable spring characteristic;
at least one electrically operated actuator configured to vary the spring characteristic of said spring unit; and
a control device for controlling said actuator;
said damper device including an electric coil device being a field generating device, and wherein an electric current intensity in said electric coil device is periodically re-set, with at least some periods for resetting being shorter than 1 second.

* * * * *